US000002026H

(19) United States

(12) Statutory Invention Registration (10) Reg. No.: US H2026 H

White et al. (43) Published: Jun. 4, 2002

(54) BRAKE SERVICE SIGNALING SYSTEM

(76) Inventors: Jay D. White, 9445 Treetop Dr., Galesburg, MI (US) 49503; James R. Clark, 409 Midlake, Plainwell, MI (US) 49080; LaVerne A. Caron, 2550 Cutty Sark Dr., Kalamazoo, MI (US) 49009

(21) Appl. No.: 08/999,919

(22) Filed: Dec. 8, 1997

Related U.S. Application Data

(63) Continuation-in-part of application No. 08/752,077, filed on Nov. 19, 1996, now abandoned, which is a continuation of application No. 08/541,840, filed on Oct. 10, 1995, now abandoned.

(51) Int. Cl.[7] ..... F16D 66/00

(52) U.S. Cl. ..... 188/1.11 L; 188/1.11 W

(58) Field of Search ..... 188/1.11 R, 1.11 E, 188/1.11 W, 1.11 L

(56) References Cited

U.S. PATENT DOCUMENTS

| | | | | |
|---|---|---|---|---|
| 3,356,188 A | | 12/1967 | Goldman et al. | |
| 3,776,329 A | * | 12/1973 | Hope et al. | 188/1.11 L |
| 4,606,435 A | * | 8/1986 | Johnson | 188/1.11 L |
| 4,642,603 A | | 2/1987 | Martinez, Jr. | |
| 4,757,300 A | | 7/1988 | Sebalos | |
| 4,776,438 A | | 10/1988 | Schandelmeier | |
| 4,800,991 A | | 1/1989 | Miller | |
| 4,883,150 A | | 11/1989 | Arai | |
| 5,044,302 A | | 9/1991 | Goldfein et al. | |
| 5,140,932 A | | 8/1992 | Goldfein et al. | |
| 5,320,198 A | | 6/1994 | Hoyt et al. | 188/1.11 |
| 5,358,075 A | * | 10/1994 | Jarzombeck | 188/1.11 L |
| 5,441,128 A | | 8/1995 | Hoyt | 188/1.11 |

* cited by examiner

*Primary Examiner*—Charles T. Jordan
*Assistant Examiner*—Michelle Thomson
(74) *Attorney, Agent, or Firm*—Liniak, Berenato, Longacre & White

(57) ABSTRACT

A brake service signaling system for use on a vehicle responsive to the angular relationship between an actuator lever arm and an actuator rod having an attachment clevis where a switch electrically connected to a processing unit is mounted to the attachment clevis for contact and activation with the actuator lever when the brake requires service which is signaled to the operator by the processing unit.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG 1
PRIOR
ART
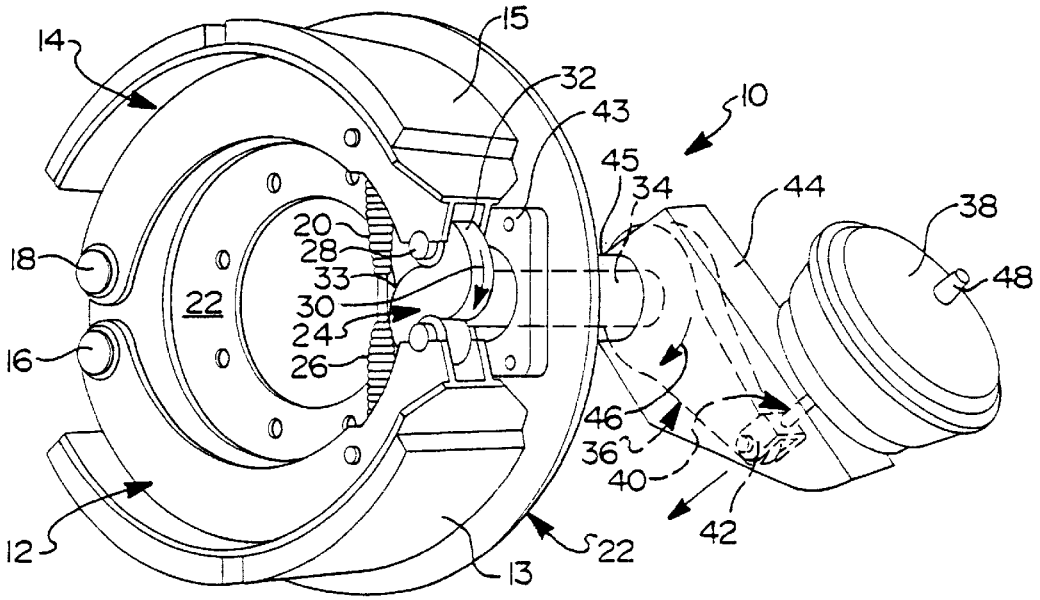
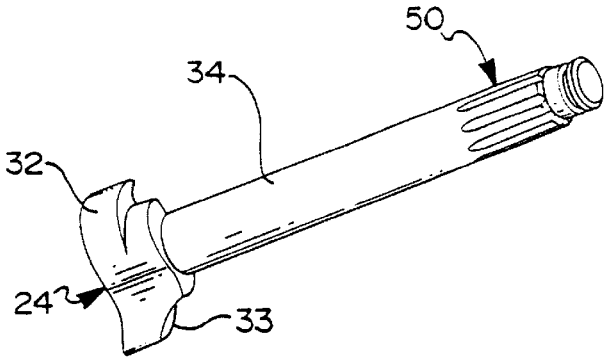
FIG 2
PRIOR
ART

FIG 3
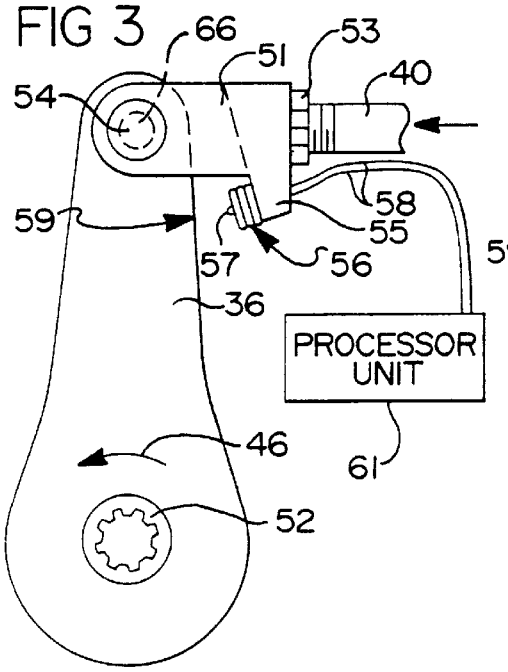
FIG 4
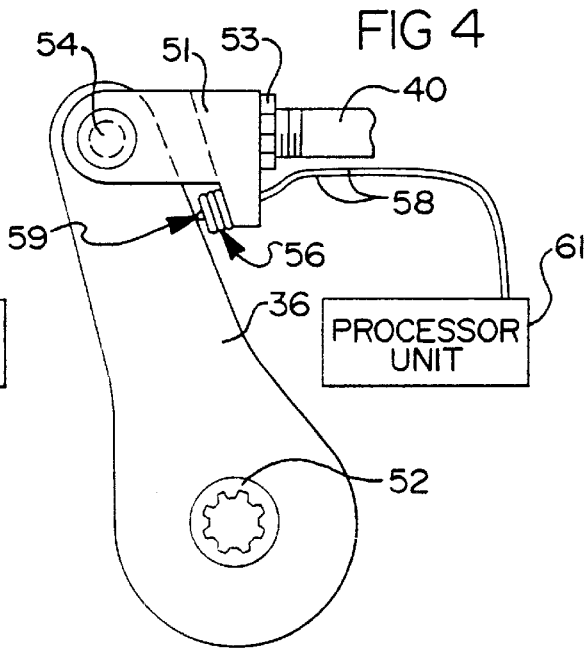
FIG 5
PRIOR ART
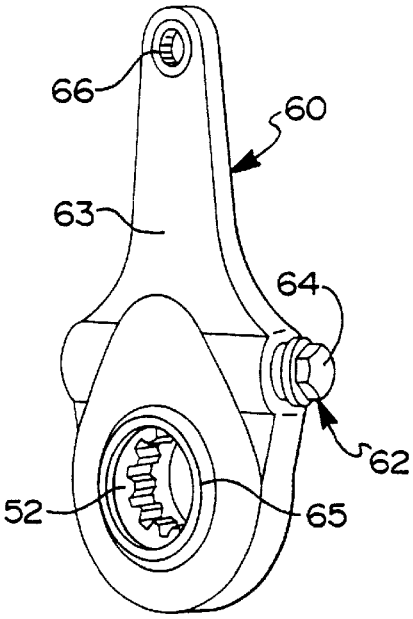
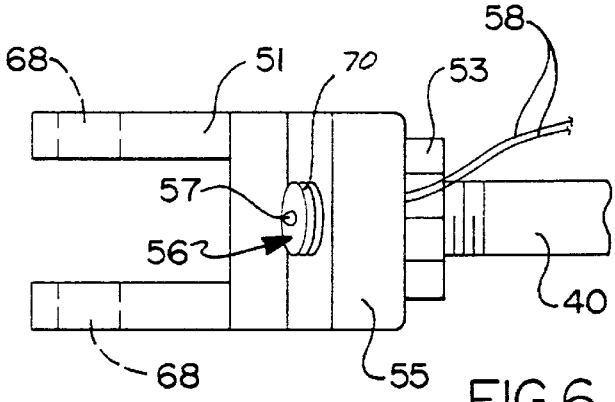
FIG 6

BRAKE SERVICE SIGNALING SYSTEM

This application is a continuation in part of Ser. No. 08/752,077, filed Nov. 19, 1996, abandoned, which is a CON of Ser. No. 08/541,840, filed Oct. 10, 1995 abandoned.

BACKGROUND OF THE INVENTION

1. Field of the Invention

The present invention relates to a brake service signaling warning system for a vehicle brake and more specifically to a brake lining wear signaling system for an "S" cam type truck brake where a switch is mounted on the actuator lever arm.

2. Description of the Prior Art

The braking systems in transport trucks have parts that wear and are expendable and by reason of this such braking systems require continuous surveillance for proper maintenance. Unfortunately many braking systems, and especially the portions that are expendable, are concealed or difficult to perform inspection and some require at least partial dismantling to learn of their condition. Inspection procedures are inconvenient and time consuming and consequently brake system maintenance is often neglected which often leads to substantial safety hazards.

By far the greatest number of transport vehicle accidents that are caused by vehicular equipment are caused in some fashion by braking systems. Responsively, various sensing systems have heretofore become known to sense and sometimes annunciate brake condition, but no such systems have effectively resolved all of the associated problems. The instant invention provides a new, novel and improved member of this class of device.

Almost universally truck braking systems have standardized drum-type brakes with two arcuate shoe arms pivotally carried at first adjacent ends inside a brake drum for expansion against the inner surface of the drum to cause frictional braking action. The shoe arms are expanded by an "S" cam that is rotated between second adjacent ends of the opposed arms to cause both shoe arms to move radially outwardly in substantially similar fashion.

Most modern pneumatic braking systems have a diaphragm type canister that applies motive force to an actuator arm or lever which can include a slack adjuster mechanism that in turn rotates the "S" cam shaft for braking. A valve operated by the vehicle brake pedal releases compressed air to the canister to move the diaphragm. By the nature of this system, unlike hydraulic systems common in automobiles, little if any indication of brake condition is given to an operator. The pneumatic canister that applies braking force is limited in its stroke and because of wear of the brake shoes, can progress to the point that the canister stroke is not enough to apply adequate force to the brakes. If a slack adjuster is available, then the actuator lever can be repositioned and the brakes can be used until the brake shoes wear out. Because of the high mechanical advantage built into the system to provide larger motion of the air canister diaphragm that is translated to a smaller motion of the brake shoes, the wear condition is not well indicated to an operator by brake function.

Various devices have heretofore become known to sense motion parameters of braking systems to determine system condition. The most common parameter measured has been the movement of a cylinder or diaphragm which ultimately moves the brake shoe arms (see U.S. Pat. Nos. 5,226,509 and 5,213,056 the disclosures of which are hereby incorporated by reference. Other devices have sensed the thickness of brake shoe lining, commonly by signally when the distance between a brake shoe arm and the associated brake drum reaches a given point (see U.S. Pat. Nos. 3,533,491 and 3,958,445). At least one prior device as disclosed in U.S. Pat. No. 5,253,735, the disclosure of which is hereby incorporated by reference, senses the angular motion of the slack adjuster arm that rotates the "S" cam shaft to indicate brake shoe lining wear. Some of these sensing devices have proven to be effective at signaling the point that brake maintenance is required, but various limitations have prevented wide spread use in the truck industry.

Most known brake condition sensors have been concerned with the state of brake shoe linings, though the amount of "throw" or motion required to actuate the braking system is generally of substantially equal importance. "S" cam activated braking systems generally may be adjusted by a slack adjustment mechanism incorporated into the lever which changes the angular position of the "S" cam shaft at which rotary motion is first applied to move that shaft. This allows a brake system to be adjusted to accommodate wear of both the brake shoe lining and of the "S" cam and its contacting pins, thereby staying within the limits of motion of the actuator and linkage. If slack adjustment is not properly made, the air canister rod stroke may not be sufficient to properly operate the braking system and if shoe wear is great the "S" cam can even rotate off brake shoe contact pins to cause a braking system to become inoperative.

Slack adjusters incorporated into the actuator lever are either manually or automatically adjustable to compensate for wear of the brake lining, such adjustment being usually accomplished by rotating the cam shaft relative to the slack adjuster lever to reposition the cam between the brake shoe ends so that in the brake relaxed condition, the clearance distance between the brake shoe linings and the brake drum can be maintained at a given distance regardless of lining wear.

After the actuator lever or actuator lever with slack adjuster reaches its limit of travel, it would be desirable to signal the end of service life of the brake lining to the operator so that new linings can be installed. The rotational position of the cam shaft and the actuator lever is therefore an indication of the degree of wear of the brake linings.

If no automatic slack adjuster is provided, then the operator or mechanic must manually adjust the length of the link connecting the actuator to the lever to provide proper actuation of the brake. Once the brake lining has worn to its service limit, then the brake shoes must be relined or replaced. Unless the service limit of the brake lining is somehow indicated by reference to the lever or the link geometry, then the brake drum must be removed to allow for visual inspection of the linings and the position of the "S" cam. The "S" cam can also reach a service limit where any additional rotation of the cam shaft would result in the "S" cam rotating into a position where brake shoes expansion no linger occurs and the "S" cam and brake can sustain damage.

Thus, it would be desirable to give the operator an indication that the brakes have reached or are about to reach their service limit so that the proper maintenance can be undertaken prior to degradation of brake performance and/or damage.

SUMMARY OF THE INVENTION

The present invention provides a system to monitor the travel of the actuator and actuator lever and subsequent rotation of the cam shaft to provide a signal to the vehicle operator when the brake linings require servicing. A modification is made to the brake rod clevis to allow for the mounting of a push switch positioned to be activated by contact with the actuator lever (which may incorporate a slack adjuster) when the brake service limit has been reached and/or when the slack in the brake actuation mechanism requires adjustment. A mounting boss formed into the clevis casting provides a mounting structure for the switch while a qualified surface machined into the actuation lever provides a precise angular point of contact to be made with the switch. In this manner, as the brake lining wears, the angular relationship between the actuator rod and the actuator lever changes to reflect that wear and the switch mounted to the clevis contacts and is actuated by contact with the brake lever at a given point of brake lining wear and/or to signal when manual adjustment of the brake slack adjuster is required.

An object of the present invention is to sense when the relative angle between the brake actuator rod and the actuator lever has decreased to a given point thereby indicating that service of the brake system is required.

Another object of the present invention is to sense the relative angle between the brake actuator rod and the actuator lever using a switch mounted to either the actuator rod or the actuator lever.

Another object of the present invention is to sense the relative angle between the brake actuator rod and the actuator lever using a switch mounted to the clevis link of the actuator rod and positioned to contact the actuator lever.

Still another object of the present invention is to sense the relative angle between the brake actuator rod and the actuator lever as a means to indicate to the operator that brake service is required.

BRIEF DESCRIPTION OF THE DRAWINGS

FIG. 1 is a perspective view of a prior art brake assembly;

FIG. 2 is a perspective view of a prior art actuator shaft;

FIG. 3 is an elevational view of the attachment clevis of the present invention connected to an actuator lever shown in a nonactivated state;

FIG. 4 is an elevational view of the attachment clevis of the present invention connected to an actuator lever shown in an activated state;

FIG. 5 is a perspective view of a prior art slack adjuster incorporated into an actuator lever; and FIG. 6 is a bottom view of the attachment clevis of the present invention of FIGS. 3 and 4.

DETAILED DESCRIPTION OF THE PREFERRED EMBODIMENT

Certain terminology will be used in the following description for convenience in reference only and will not be limiting. For example, the terms "forward" and "rearward" will refer to directions forward and rearward of the brake assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivatives and equivalents thereof.

Now referring to FIG. 1, a perspective view of a brake assembly 10 is shown where opposing brake shoes 12 and 14 including brake linings 13 and 15 are mounted on a brake spider 22 by pivot pins 16 and 18 respectively at one end of the brake shoes 12 and 14. At a second end of brake shoes 12 and 14 a return spring 20 urges the brake shoes 12 and 14 into rolling contact with an "S" cam 24 through rollers 26 and 28. As the "S" cam 24 rotates in the direction of arrow 30, the surface 32 of the "S" cam 24 contacts the roller 26 and causes the brake shoe 12 to steadily move toward the outer brake drum (not shown) until the brake lining rubs against the brake drum and the desired level of frictional braking is reached. Likewise, and concurrently, the surface 33 of the "S" cam 24 contacts roller 28 and causes the brake shoe 14 to move outward toward the brake drum until the brake lining 15 touches the brake drum and the desired level of braking is reached.

The "S" cam 24 is formed as part of, or attached to, the actuator shaft 34 which is attached to the actuator lever 36. The actuator lever 36 is connected to actuator 38 by actuator rod 40 and the prior art attachment clevis 51 in a manner that provides for the rotation of the actuator shaft 34 upon activation of actuator 38. The actuator shaft 34 is covered by a mounting tube 45 which is attached to the brake spider 22 at flange 43 by bolting. The mounting tube 45 is attached to bracket 44 which provides for the support of the actuator 38. The actuator 38 is commonly a pneumatic type where air pressure is supplied through inlet fitting 48 where it acts upon a diaphragm (not shown) thereby causing the actuator rod 40 to move outward from the actuator 38 causing the actuator lever 36 to move and rotate the actuator shaft 34 in the direction shown by arrow 46. The rotation of the actuator shaft 34 results in rotation of the "S" cam 24 shown by arrow 30 thereby actuating the brake shoes 12 and 14 and causing the brake linings 13 and 15 to move outward so as to contact the brake drum (not shown) and thereby frictionally apply a braking force to the brake drum and the attached wheel/tire (not shown).

Now referring to FIG. 2, a perspective view of the prior art actuator shaft 34 is shown. At one end of the actuator shaft 34 the "S" cam 24 is attached (or formed as one piece therewith) and at the other end, splines 50 are formed for nonrotational engagement with the actuator lever 36. Other methods of attachment of the actuator lever 36 to the actuator shaft 34 may be utilized such as welding or bolting.

Now referring to FIGS. 3 and 4 for a detailed description of the present invention, elevational views of the attachment clevis 51 of the present invention are shown. FIG. 3 shows the attachment clevis 51 and the actuator lever 36 in a normal orientation. A switch 56 has been mounted to a mounting mounting boss 55 formed as part of the attachment clevis 51 and positioned to face a side of the actuator lever 36 such that when the angle between the actuator rod 40 and the actuator lever 36 decreases to a given value, the actuation plunger 57 of the switch 56 contacts the actuator lever 36 as shown in FIG. 4. Thus, FIG. 4 illustrates the condition where the operator should be signaled that the brakes need attention usually replacement of the brake shoes or adjustment of the slack adjuster or adjustment of the attachment clevis 51. The attachment clevis 51 is threaded to the actuator rod 40 and secured with jam nut 53. Thus, the effective length of the actuator rod 40 can be increased or decreased by threading the attachment clevis 51 in or out thereby adjusting the relative position of the actuator lever 36 and the "S" cam 24.

As shown in FIGS. 3 and 4, splines 52 are formed in the actuator lever 36 to mate with the splines 50 formed on the actuator shaft 34 thereby providing a nonrotational relationship between the actuator arm 36 and shaft 34. The attachment clevis 51 is joined to the actuator lever 36 by pin 54 which extends from one side of the attachment clevis 51 to the other through an attachment opening 66 formed in the lever 36. The attachment clevis 51 is joined to the actuator rod 40 by threads and secured by a jam nut 53.

The switch 56 is of a common variety push to open (normally closed) or push to close (normally open) type of contact switch. Depression of actuation plunger 57 from a normal position causes an electrical circuit to become open or closed depending on the processing requirements of a processor unit 61. Leads 58 electrically connect the contacts of switch 56 to the processor unit 61 which then signals the vehicle operator and/or other processing unit when brake service is required.

If the relative angular orientation of the actuator lever 36 to the actuator shaft is fixed, then the signal would signify that the brake linings 13 and 15 need replacement or that the attachment clevis 51 should be rotated on the actuator rod 40 to lengthen its effective length. FIG. 4 illustrates such a condition where the lever 36 has been rotated by the actuator 38 as a result of axial outward travel of the actuator rod 40 causing the actuator lever 36 to rotate with the actuator shaft 34 in the direction of the arrow 46. If the brake lining 13 and 15 are overly worn, the actuator lever 36 must rotate the actuator shaft 34 to such a degree that the switch 56 contacts the actuator lever 36 and the actuation plunger 57 of the switch 56 contacts a qualified surface 59 of the lever 36 thereby causing the vehicle operator to be warned of the worn brakes by action of the processor unit 51.

FIG. 5 illustrates a prior art slack adjuster 60 which provides for adjustment of the angular orientation between the actuator lever 36' which has been supplemented by slack adjuster 60 and the actuator shaft 34. The adjustment mechanism 62 provides for rotation of splines 52 relative to the main body 63 of the actuator lever 36'. By rotating the adjuster bolt 64, a worm gear rotates and engages and rotates the ring 65 in which the splines 52 are formed. When combined with the attachment clevis 51 of the present invention, the slack adjuster 60 can be adjusted when the switch 51 touches the actuator lever 36' thereby signaling to the processor unit 61 and to the operator that the brakes need servicing in the form of adjustment of the slack adjuster 60 or that the travel of the "S" cam 24 has reached the end of its travel, or that the brake linings 13 and 15 have worn to their service limit and require replacement.

If no slack adjuster 60 is used, the relative angle between the actuator lever 36 and the actuator shaft 34 cannot be changed, and contact of the switch actuation plunger 57 to the actuator lever 36 means that the brake linings have to be replaced or that the attachment clevis 51 needs adjustment to return the brake lever 36 to its normal range of angular travel relative to the actuator rod 40.

FIG. 6 is a bottom view of the attachment clevis 51 of FIGS. 3 and 4. The actuator rod 40 is threaded to engage threads cut into the clevis 51 where a jam nut 53 is used to secure the actuator rod in position and prevent rotation of the actuator rod 40 relative to the attachment clevis 51 until adjustment is required to return the actuator 38 into its normal range of travel. The mounting boss 55 provides a mounting surface for the switch 56 having an actuation plunger 57. Attachment holes 68 are formed in the attachment clevis 51 to provide an opening for passage of the pin 54.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

We claim:

1. A combination brake lining wear indicator and braking system, said combination comprising:

opposed brake shoes pivotally moveable by means of an "S" cam carried for rotation on a cam shaft and activated by a radially extending actuator lever arm connected to an actuator rod by an attachment clevis; and an electrical switch mounted on said attachment clevis disposed to contact said actuator lever arm and become activated when said actuator lever arm rotates to a predetermined point associated with excessive wear of said brake linings, wherein when said electrical switch is activated said electrical switch generates a signal indicative of excessive wear of said brake linings.

2. A brake wear indicator system in a braking system having opposed brake shoes each including a brake lining mounted thereon, said brake shoes being pivotally moveable and actuated by movement of a radially extending actuator lever arm connected to an actuator rod by an attachment clevis-, said brake wear indicating system comprising:

a switch having an actuation plunger mounted to a mounting boss extending from said attachment clevis, said attachment clevis disposed so that said actuation plunger directly contacts said actuator lever thereby activating said switch only when said actuator lever arm rotates to a predetermined position as a result of excessive wear of said brake linings; and a processing unit electrically connected to said switch for processing a first signal generated by said switch and generating a second signal indicative of said excessive wear of said brake linings in response to said first signal.

3. A brake service indicating system comprising:

a brake spider; a pair of opposite brake shoes rotatably mounted to said brake spider, each of said brake shoes having a brake lining mounted thereon;

a cam rotatably mounted to said brake spider and engaging each of said brake shoes, wherein rotation of said cam displaces said brake shoes and said brake linings;

an actuator shaft connected to said cam;

a slack adjuster connected to said actuator shaft whereby rotation of said slack adjustor cause direct rotation of said actuator shaft;

an attachment clevis pivotably connected to said slack adjustor, said slack adjustor having a mounting boss extending therefrom;

an actuator rod connected to said attachment clevis whereby displacement of said actuator rod causes displacement of said attachment clevis thereby rotating said slack adjustor which in turn rotates said actuator shaft and said cam to displace said brake shoes;

a switch mounted to said mounting boss and disposed between said slack adjustor and said attachment clevis such that when as said actuator rod is displaced a gap between said switch and said slack adjuster is changed, wherein when said actuator rod is displaced a predetermined distance, said slack adjustor engages said switch; and a processing unit electrically connected to said switch, said processing unit generating a brake service signal when said slack adjuster engages said switch.

* * * * *